(12) United States Patent
Ghislandi et al.

(10) Patent No.: US 11,527,046 B2
(45) Date of Patent: Dec. 13, 2022

(54) REAL WORLD BEACONS INDICATING VIRTUAL LOCATIONS

(71) Applicant: Sony Interactive Entertainment LLC, San Mateo, CA (US)

(72) Inventors: Charles Ghislandi, Los Angeles, CA (US); Derek Crosby, Lake Balboa, CA (US)

(73) Assignee: Sony Interactive Entertainment LLC., San Mateo, CA (US)

( * ) Notice: Subject to any disclaimer, the term of this patent is extended or adjusted under 35 U.S.C. 154(b) by 0 days.

(21) Appl. No.: 17/106,992

(22) Filed: Nov. 30, 2020

(65) Prior Publication Data

US 2022/0172437 A1 Jun. 2, 2022

(51) Int. Cl.
*G06T 19/00* (2011.01)

(52) U.S. Cl.
CPC .......... *G06T 19/006* (2013.01); *G06T 19/003* (2013.01)

(58) Field of Classification Search
CPC . G06T 19/006; G06T 19/003; H04N 21/4227; H04N 21/44218; H04N 21/4788; H04N 21/816; G06F 3/011
See application file for complete search history.

(56) References Cited

U.S. PATENT DOCUMENTS

| | | | |
|---|---|---|---|
| 2012/0281114 A1* | 11/2012 | Shapiro | G11B 27/034 348/231.99 |
| 2019/0102949 A1* | 4/2019 | Sheftel | G06T 15/20 |
| 2019/0394362 A1* | 12/2019 | Chong | H04N 21/4131 |
| 2020/0297262 A1* | 9/2020 | Chappell, III | A61B 5/165 |

FOREIGN PATENT DOCUMENTS

| | | | | |
|---|---|---|---|---|
| WO | 2019068035 A1 | | 4/2019 | |
| WO | WO-2019068035 A1 | * | 4/2019 | ....... H04N 21/42203 |

OTHER PUBLICATIONS

"International Search Report and Written Opinion", dated Jan. 11, 2022 from PCT application PCT/US21/061100.

* cited by examiner

*Primary Examiner* — Jeffery A Brier
(74) *Attorney, Agent, or Firm* — John M. Rogitz; John L. Rogitz

(57) ABSTRACT

Techniques are described for facilitating the coordination of audio video (AV) production using multiple actors in respective locations that are remote from each other, such that an integrated AV product can be generated by coordinating the activities of multiple remote actors in concert with one another. A director can indicate in the virtual world a desired location of a stage prop, and a beacon may then be transmitted toward a real world location corresponding to the desired location to aid in placement of the prop.

17 Claims, 6 Drawing Sheets

REAL WORLD BEACONS INDICATING VIRTUAL LOCATIONS

FIELD

The application relates generally to technically inventive, non-routine solutions that are necessarily rooted in computer technology and that produce concrete technical improvements. In particular, the present application relates to techniques for enabling collaborative remote acting in multiple locations.

BACKGROUND

Owing to health and cost concerns, people increasingly collaborate together from remote locations. As understood herein, collaborative movie and computer simulation (e.g., computer game) generation using remote actors can pose unique coordination problems because a director must direct multiple actors each potentially in his or her own studio or sound stage in making movies and for computer simulation-related activities such as motion capture (MoCap). For example, challenges exist in providing remote actors physical references on their individual stages or studios in a manner that action is coordinated. Present principles provide techniques for addressing some of these coordination challenges.

SUMMARY

Present principles thus provide an apparatus that includes at least one processor programmed with instructions to identify in virtual reality (VR) space a location a video prop is desired to be located and to transmit in real world (RW) space at least one beacon toward a RW location corresponding to the location in VR space at which the video prop is to be located.

In some example implementations, the beacon may include a visible beacon, such as a laser beam. Additionally or alternatively, the beacon may include an audible sound and/or a screen display on a handset.

Still further, if desired the instructions may be executable to identify location of the prop in the RW over time.

Also, in some example embodiments the instructions may be executable to transmit the beacon at least in part based on the location of the prop in the RW.

In another aspect, a device includes at least one computer storage that is not a transitory signal. The computer storage includes instructions executable by at least one processor to receive indication in virtual reality (VR) space of a virtual location and to transmit a beacon in the real world (RW) indicating the virtual location.

In still another aspect, a computer-implemented method includes indicating a location in virtual space at which an object is desired to be located and presenting a beacon in the real world (RW) directing toward a RW location corresponding to the virtual location.

The details of the present application, both as to its structure and operation, can best be understood in reference to the accompanying drawings, in which like reference numerals refer to like parts, and in which:

DETAILED DESCRIPTION

Figure 1:
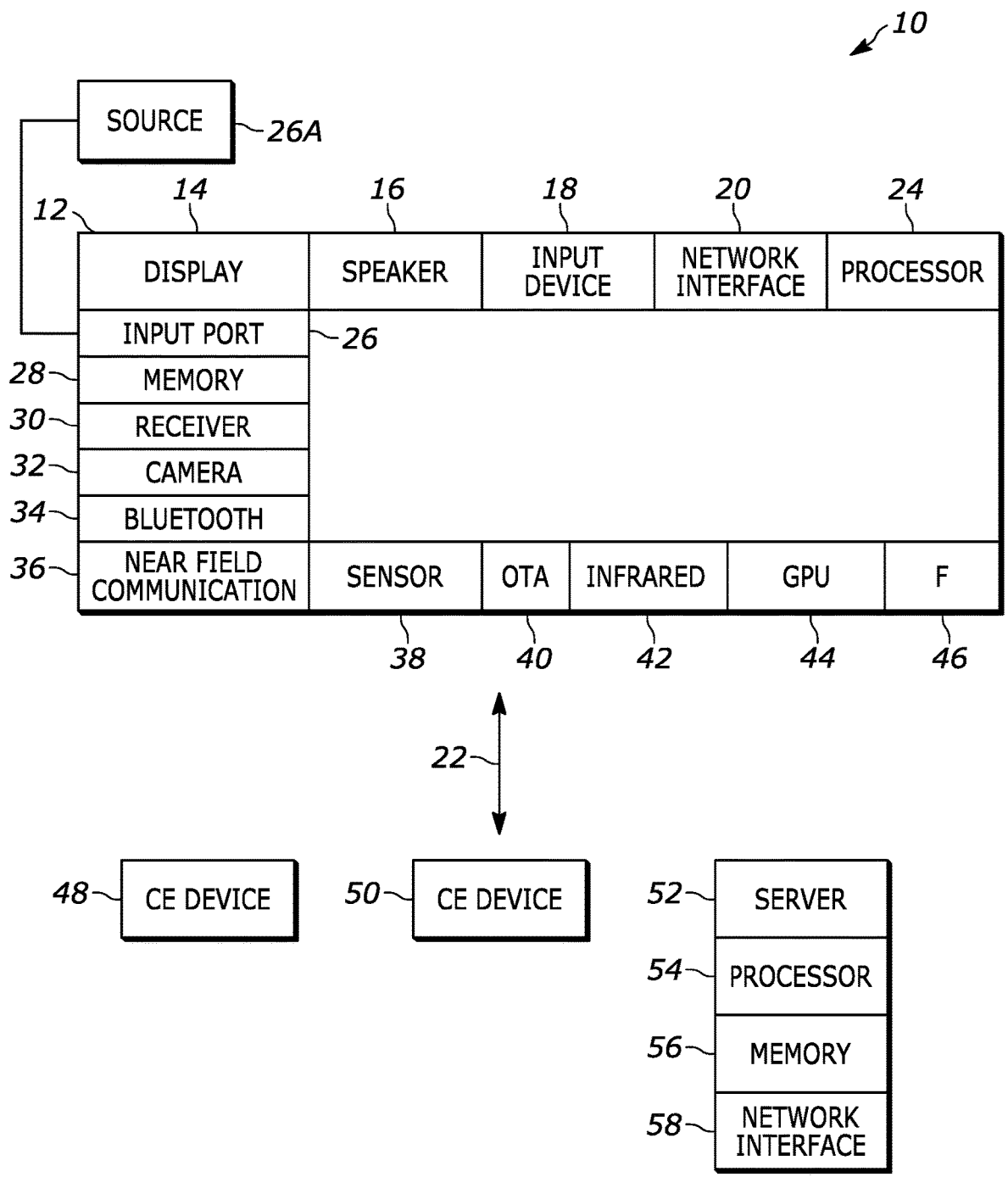
FIG. 1 is a block diagram of an example system consistent with present principles.

Now referring to FIG. 1, this disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein are configured to undertake present principles (e.g. communicate with other CE devices using the 5G wireless standard to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, a wireless 5G network, other wide area network (WAN), a local area network (LAN), a personal area network (PAN), etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

Figure 2:
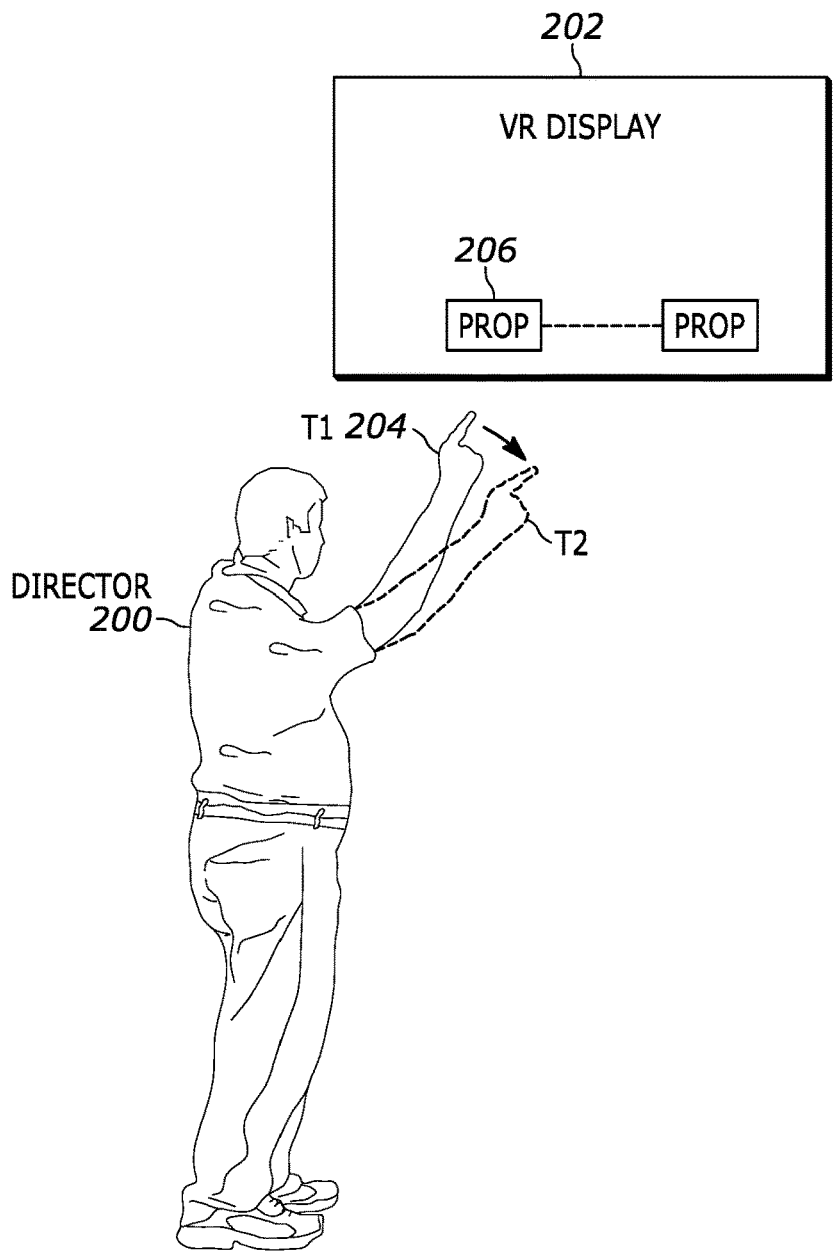
FIG. 2 illustrates a director pointing to a virtual reality (VR) display to control activity within a film set.

Now in reference to FIG. 2, it illustrates a director 200 pointing to a virtual reality (VR) display 202 to control activity within a film set and/or across multiple film sets where some actors might be remotely-located. The VR display 202 may be a television mounted on a wall, a computer monitor, or even the heads up display of a VR headset being worn by the director 200.

Consistent with present principles, images of a hand and arm 204 of the director 200 may be gathered by one or more cameras showing the director 200 within their field of view, including possibly one or more outward facing cameras on the VR headset itself if one is being worn by the director 200. Computer vision and/or gesture recognition may then be executed using the images from the camera(s) to track and identify the director 200 as performing a gesture by pointing with an index finger on the director's right hand as shown.

As shown in FIG. 2, at a first time T1, the director 200 points with the index finger at a real world (RW) video prop 206 as represented in VR space presented on the VR display 202 to indicate to the VR system that the director 200 is providing input directed to the prop 206. Then director 200 may then progressively move his right arm from left to right as shown while pointing with the index finger (or in another direction as desired) until at a later time T2, the director's arm stops moving when pointing toward a desired virtual location in VR space for the prop 206. The virtual location may correspond to a RW location on the set at which the prop 206 should be placed in the RW for interaction with one or more actors also on the set to translate RW actor actions with respect to the prop 206 into virtual space character actions. In some examples, verbal cues from the director 200 may also be used for prop movement, such as "move this prop over here" as the director 200 points to the desired virtual location for the prop.

Before moving on to the description of other figures, note that the RW, tangible prop 206 may be a number of things, including a real world inanimate stage object such as a table, a chair, etc. The prop 206 might also be a "dummy" weapon such as a fake gun or fake sword. The prop 206 might also be a cutout of a person, a sculpture representing a geographic feature, or any element corresponding in shape and possibly size to a virtual object in the VR space (e.g., a video game object), etc.

Figure 3:
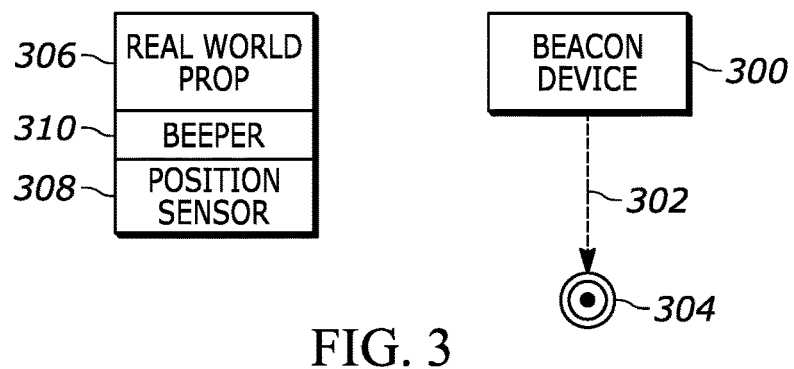
FIG. 3 illustrates a beacon used to illuminate the film set according to director commands.

FIG. 3 illustrates a beacon device 300 being used to illuminate a film set according to director commands consistent with present principles. The beacon device 300 may include hardware to transmit or present a visible beacon such as a laser beam 302. The laser beam 302 may intersect a point or location 304 on a surface toward which the laser beam 302 is directed, for example.

The laser beam 302 may be directed based on director commands and using motors or other elements within the device 300 in order to transmit the laser light in the RW toward a RW location at which a RW prop is to be placed to correspond to a VR location at which the director desires the prop 306 to be shown in VR space. As also shown in FIG. 3, the prop 306 may include a position sensor 308 such as a GPS transceiver or other suitable position senor for position tracking over time. The sensor 308 might also include, for example, a Wi-Fi or other wireless signal transceiver that may be used to triangulate and track the location of the prop 306 in all three dimensions over time based on the known locations of other devices communicating with the transceiver.

A beeper 310 may also be included on or attached to the prop 306 and may be, for example, a speaker configured to emit audible "beeps", other audible sounds, or even audible computerized verbal instructions indicating desired prop placement. A separate handset tracking its position with respect to the prop 306 may also be used to emit the beeps or other sounds if, for example, a stage hand carries the handset separately while also initially placing or moving the prop 306. But regardless, the frequency and/or volume at which the beeps are presented may for example progressively and incrementally increase as the prop 306 is tracked over time as moving toward the RW location indicated by the director at which the RW prop 306 is to be placed. Conversely, the frequency and/or volume at which the beeps are presented may progressively and incrementally decrease as the prop 306 is tracked over time as moving away from the RW location indicated by the director at which the RW prop 306 is to be placed. Then when the prop 306 is eventually located at the desired RW location, a constant noise of the same pitch as the beep may be produced by the beeper 310, and/or a tone of a different pitch may be produced to indicate the prop 306 has been located as the desired RW location.

Additionally or alternatively, in some embodiments the beeper 310 may further include a video display on which visual directional guidance may be presented, such as in the form of three-dimensional (3D) arrows or other visual guidance. But whether audible or visual guidance is presented at the beeper 310, it is to be understood that the guidance may guide a stage hand or other person to initially place or to move the prop 306 toward a RW location so that the prop 306 is also presented in VR space at a desired VR location correlated to the RW location.

Further note that in addition to or in lieu of using the guidance produced by the beeper 310, the stage hand may also move the prop 306 toward location 304 based on the stage hand visually identifying the laser beam 302 as intersecting a surface establishing the location 304.

Figure 4:
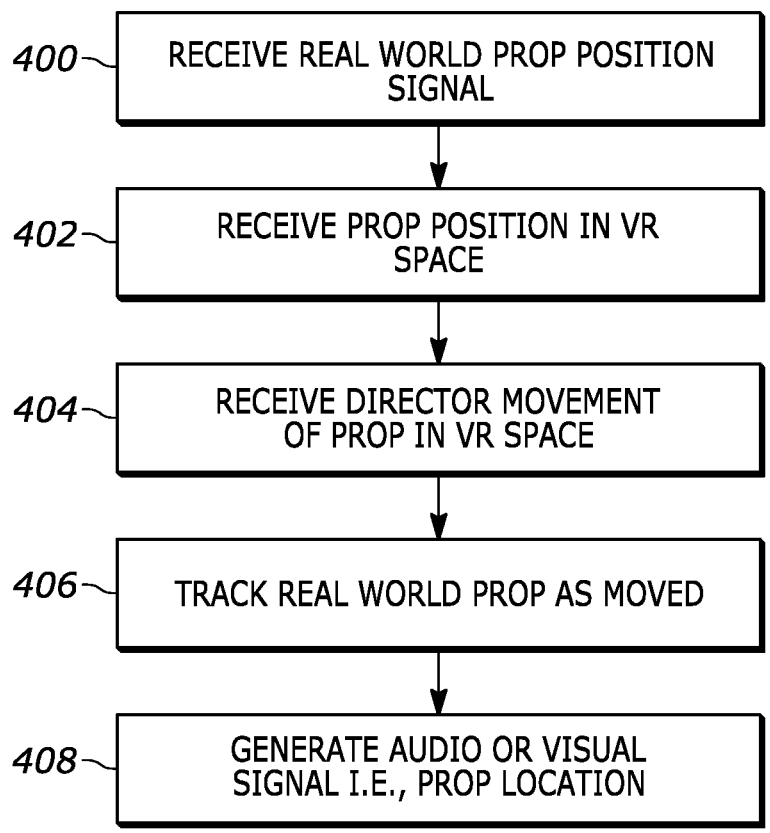
FIG. 4 illustrates example logic in example flow chart format consistent with present principles.

Now describing FIG. 4, it shows example logic in example flow chart format as may be executed by one or more devices alone or in combination consistent with present principles. For example, the logic of FIG. 4 may be executed by a server or other device that coordinates recorded RW space actions with VR space character actions to reflect the actions in VR space. The logic of FIG. 4 may also be executed by another device that communicates with the director's VR headset, the display 202, the beacon 300, and/or beeper 310 to undertake present principles.

In any case, the logic may begin at block 400 where the device may receive a RW prop position signal indicating the current location of the prop, such as from a GPS transceiver or other position transceiver on the prop. The logic may then proceed to block 402 where the device may receive the prop's position in VR space, e.g., as facilitated by a VR simulation engine running at the device or elsewhere that correlates RW space coordinates as captured by one or more cameras in the RW to VR space coordinates.

After block 402 the logic may proceed to block 404. At block 404 the device may receive director movement of the prop in VR space, such as the director virtually moving the prop's representation in VR space and/or by specifying via gestures or verbal cues where the prop's VR representation should be located in VR space. Thereafter the logic may proceed to block 406.

At block 406 the device may track the RW position of the prop while stationary and/or moving across RW space. After block 406 the logic may proceed to block 408. At block 408 the device may generate and/or transmit one or both of audio and visual signals regarding where the prop should be located in RW space to correspond to a VR location indicated by the director. For example, at block 408 the device may control the device 300 to emit a laser as described above and/or control the beeper 310 to present audible and visual assistance as described above.

Figure 5:
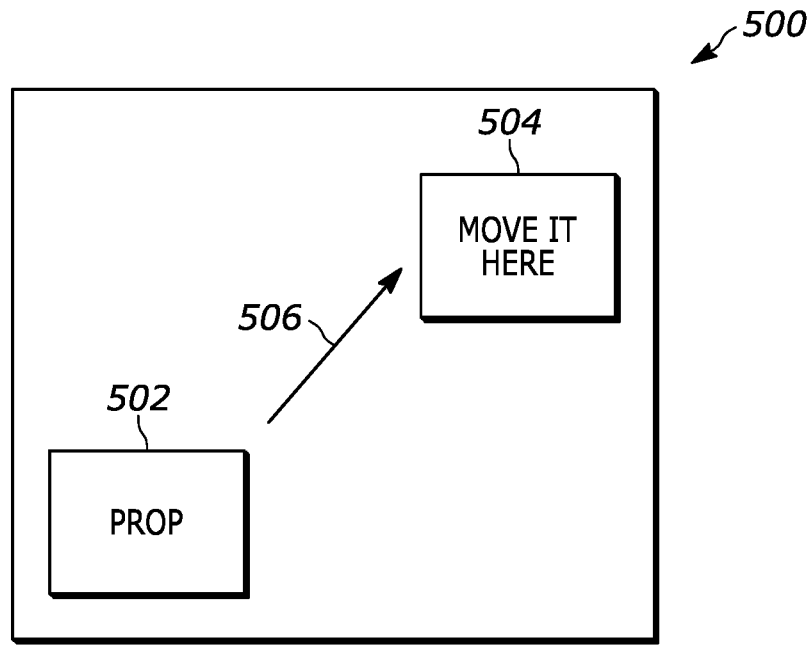
FIG. 5 illustrates a screen shot of an example screen display.

Continuing the detailed description in reference to FIG. 5, it illustrates an example screen shot 500 of an example screen display. For example, the screen display may be presented on the display of a handset such as a dedicated prop device handset or even smartphone. The screen shot 500 may also be presented on the video display of the beeper 310 described above in embodiments where the beeper 310 includes a video display.

In any case, as shown in FIG. 5 a prop image 502 may be presented on the screen display either using an actual image of the prop from a camera or using a computer-generated representation of the prop. The screen display may also include a location indication 504 represented on the screen display that corresponds to a RW stage location to which the prop itself should be moved.

As also shown in FIG. 5, an arrow 506 or other graphical indicator may also be presented as part of the screen display and be adjusted in real time as the prop moves across RW space to indicate the location to which the prop should be moved with respect to the current location of the prop. Thus, the arrow 506 may be presented in 3D form on the screen display to point toward the indication 504 to lead the stage hand, as he/she moves the prop, from a current RW location of the prop correlated to the image 502 to a RW location of the director's desired prop position as correlated to the indication 504.

FIGS. 6-9 further illustrate enabling a director to command movement of real world props (real world inanimate stage objects such as tables, chairs, etc.) in one or more studios or stages consistent with present principles. In this example, assume a real world prop is tracked by imaging the prop using a camera in the studio or by receiving, e.g., position information of the prop from a location receiver such as a global positioning satellite (GPS) receiver on the prop.

Figure 6:
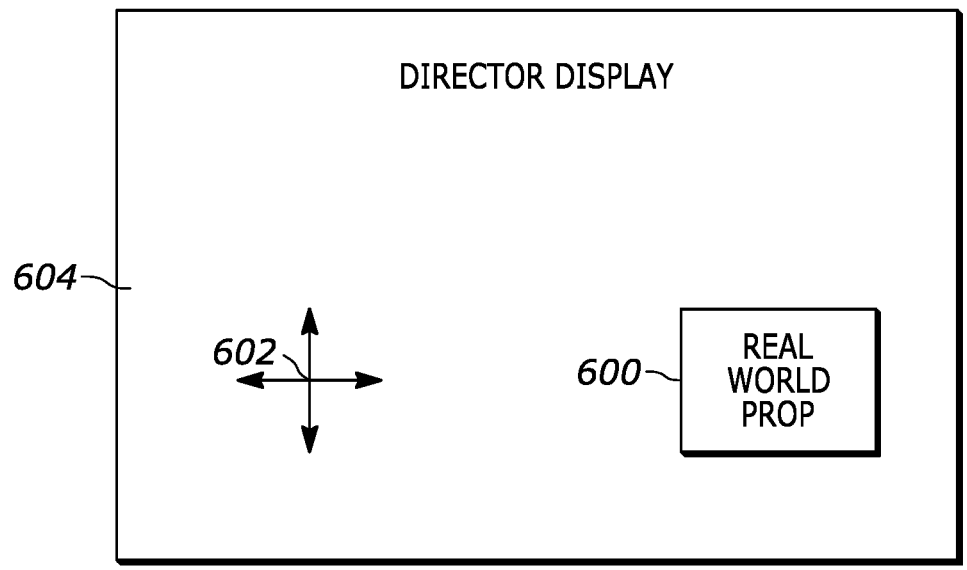
FIG. 6 is a screen shot of an example director display.
Figure 7:
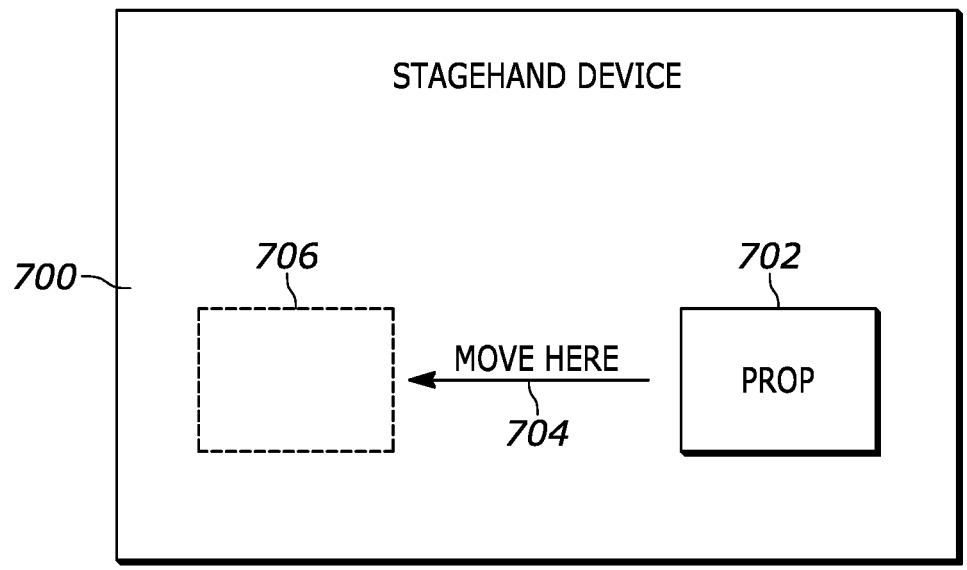
FIG. 7 is a screen shot of an example stagehand screen display.

FIG. 6 illustrates an image 600 of a real world prop in virtual space on a director computer 604. The director operating the director computer 604 can move the image 600 using voice commands and/or a selector element 602 presented on the display of the computer 604 to cause a command to be transmitted to a stagehand device 700 shown in FIG. 7 and located at the real location at which the prop corresponding to the image 600 is located. The stagehand device 700 may be a portable computer such as a cell phone or a tablet or other appropriate device that may include, e.g., an organic light emitting diode (OLED) display.

The command includes location information of the prop from whence an image 702 of the prop can be placed in virtual space and presented on the stagehand device 700. The director command is graphically and/or textually and/or audibly presented on the stagehand display as indicated at 704 to indicate the desired new location of the prop at 706. As the real world prop is moved, it is tracked as discussed herein and its location in virtual space presented on both the director computer 604 and stagehand device 700, so that both the director and stagehand can monitor movement in virtual space of the prop until it is located at the desired location 706.

Figure 8:
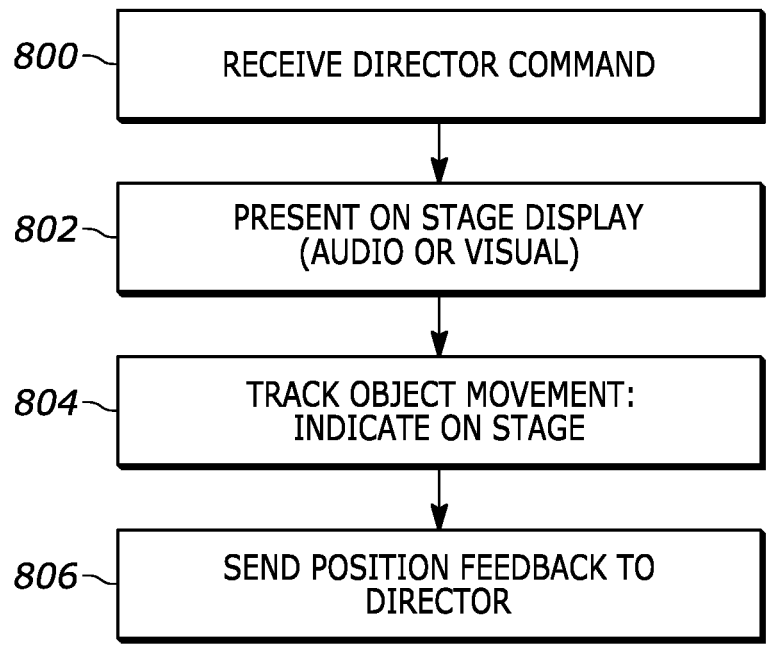
FIG. 8 illustrates additional example logic in example flow chart format consistent with present principles.

FIG. 8 further reflects the above discussion. At block 800, the stagehand device 700 receives the director command from the director computer 604. Moving to block 802, the image of the prop is presented on the stagehand display, audibly and/or visibly. As the prop is moved, its real world location is tracked and converted to virtual space at block 804, with feedback of the movement of the prop being sent to the director computer 604 and updated on the stagehand device 700 at block 806, such as by updating the virtual location of the images 600, 702 of the prop on the respective displays.

Figure 9:
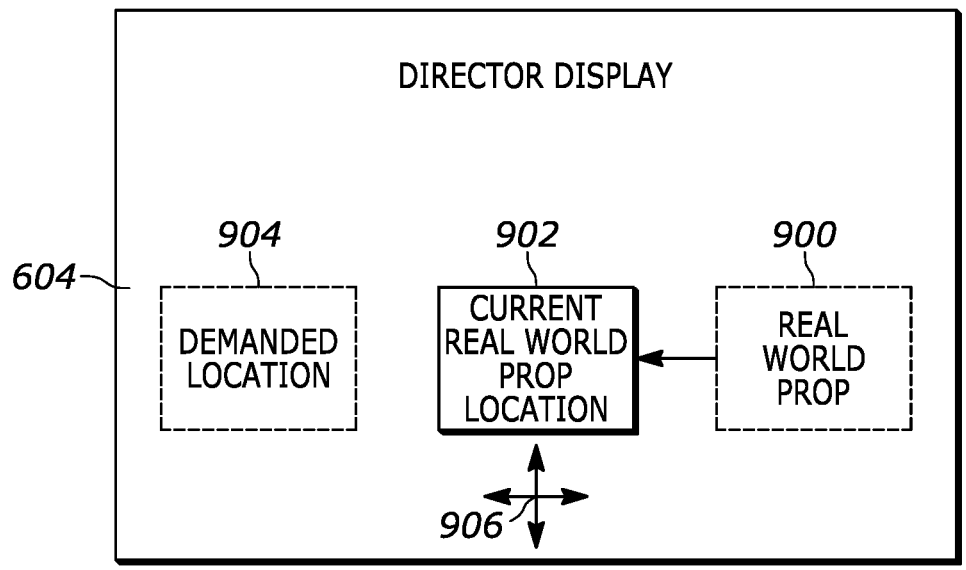
FIG. 9 is yet another screen shot of an example director display.

FIG. 9 illustrates that the director may elect to give feedback to the stagehand to position the prop in the real world to get to the director's desired location. The director computer 604 may present an image 900 of the prop at an initial location, an image 902 of the prop in its current location as it is being moved, and an image 904 of the prop in the desired location, with an input element 906 being provided to allow the director to input and transmit a command for the stagehand to continue moving the prop in an indicated direction, e.g., using up, down, left, and right commands corresponding to the various arrows establishing the element 906.

Figure 10:
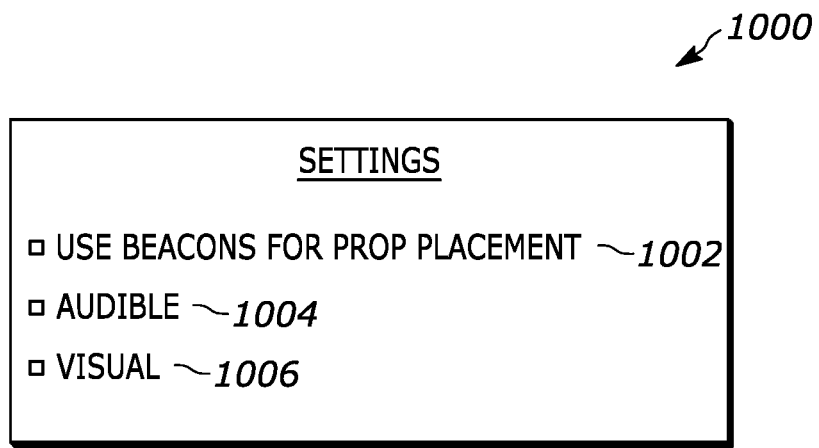
FIG. 10 illustrates an example settings graphical user interface (GUI) presentable on a display consistent with present principles.

Now describing FIG. 10, it shows an example settings graphical user interface (GUI) 1000 that may be presented on a display of a device or system configured to operate consistent with present principles. For example, the GUI 1000 may be presented on the display of the director computer 604, a director's headset or connected laptop computer, a remotely-located server, or another device that controls beacon use consistent with present principles. Note that each option to be discussed below may be selected by directing touch or cursor input to the checkbox adjacent to the respective option.

As shown in FIG. 10, the GUI 1000 may include a first option 1002 that may be selectable to set or enable a VR device or system to undertake present principles. For example, the option 1002 may be selected to set or configure one or more device(s) to execute the logic of FIGS. 4 and/or 8 to present or transmit beacons as disclosed herein as well as to undertake other functions described above. FIG. 10 also shows that the GUI 1000 may include a second option 1004 that may be selectable to set or enable the device or system to specifically use audible beacons consistent with present principles. The GUI 1000 may further include a third option 1006 that may be selectable to set or enable the device or system to specifically use visual beacons consistent with present principles, such as lasers and screen displays as described herein.

Thus, it may be appreciated based on the description of the foregoing figures that VR directing and/or remote filming may be facilitated so that the director can see the virtual scene itself from the perspective of the director or a game player within the virtual scene and get a spatial sense of the actors in context. In some examples, in addition to or in lieu of the director using a VR headset to view the VR scene and specify prop placement/location, the director may also use a RW rig with remote controllers to "hold" a corresponding virtual rig in virtual space and see the corresponding perspective in the VR scene in order to move the VR rig around and hence move the VR first-person perspective of the director around in the virtual space. In some examples, the director would even "pick up" the VR rig and put it where he/she wants it, and then let it go so that the VR perspective represented to the director is shown as the perspective of the now-stationary virtual camera on the VR rig while at the designated location.

Either way, upon seeing the perspective of the virtual camera within the VR scene, the director may then communicate with stage hands and other assistants at various remotely-located stages for which RW actions performed at the stages are to be merged into a single VR scene in order to give instructions for prop placement. In some examples, an artificial neural network (ANN) with an input layer, output layer, and one or more hidden layers in between may be encoded to listen for the director's commands and present directional assistance to the stage hands based on that. Thus, voice commands, RW prop locations, and corresponding VR locations for props may be provided as input to the ANN during training to train the ANN to output directional assistance in the forms of audible beeps, lasers, screen displays, etc. as disclosed herein.

Thus, the present disclosure may assist in the director's ability to record performances not just of various actors helping to create the VR scene but to also record or present the director's perspective and help enhance the director's ability to interact with virtual objects corresponding in VR space to RW props in RW space. The generated data, interactions, etc. may then be made available for post-processing to merge the recorded RW scenes from the remotely-located stages into a single VR scene.

In this vein, a director's virtual camera (e.g., the perspective of the director within the VR scene) can be changed by moving a director's RW camera or by switching to different RW cameras so that the director while inside the VR scene can see the virtual "set" (e.g., the VR scene itself), see the locations of the actors within the VR scenes as the actors move around virtually in the scene based on their tracked RW movement, and even see the locations of props as tracked by the VR system so that the director would know when the prop is at the director's desired virtual location.

This may be accomplished by the director, while immersed in the VR scene, clicking or pointing using his/her RW arms to where he/she wants the prop located in the VR scene. The director's assistant on one of the RW, physical sets could then have an audio and/or visual guide to lead them to the RW stage location being pointed at that corresponds to the location within the VR scene to help the assistant as the assistant gets closer to the correct RW coordinates matching the VR coordinates of the prop location desired by the director, possibly while compensating for an XYZ dimensional offset between the RW space and corresponding VR space. Thus, feedback may be given to the assistant to position, on the RW stage, the prop at the director's desired position.

Thus, in some examples to establish a new static position for a prop, the feedback may be in the form of a handset with a display screen indicating where to move the RW prop to place it where the director wants it. The assistant may also use an audio earpiece or another type of speaker to navigate the prop across RW space to the director's desired position.

Additionally or alternatively, a drone or other device may in some examples autonomously navigate itself in the RW and through the air to a desired prop location. The assistant may then take the prop itself to the location of the drone at the desired prop location and replace the drone with the prop at the location.

Thus, a beacon consistent with present principles may take various forms to tell the assistant (or other person) where coordinates for the director's desired VR location for the prop are located in the corresponding real space of the set. The director may thus be immersed in and looking at a VR scene (e.g., using a VR headset) and say something like "I think this rock needs to be over here". The system may use a digital assistant, natural language understanding, and/or voice recognition technology to identify the director's utterance and identify that it was uttered while the director also clicked on, pointed to, or otherwise selected the rock (e.g., select it in virtual space using a VR controller). Based on those two inputs, the VR system may command another device like a handset that might be sitting offset to start buzzing using a vibrator to indicate the director has established coordinates at which the rock should be placed. The assistant may then notice this, pick up the handset, and use the arrows or other guides it presents to pick up the RW rock itself and navigate it to the RW place on the set or stage that corresponds to the coordinates established by the director.

If the rock's position is still not quite where the director wants it, the director could then say "move to left", "move to the right", etc. and the additional cues may be provided to the handset to further guide the assistant. Or again the director might click or select the virtual space location corresponding to the RW location where he/she wants the rock (or other prop) placed.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one processor programmed with instructions to:
   identify in virtual reality (VR) space a location a video prop is desired to be located; and
   transmit in real world (RW) space at least one beacon toward a RW location corresponding to the location in VR space at which the video prop is to be located to intersect the RW location, wherein the beacon comprises a visible beacon or an audible beacon or both a visible beacon and an audible beacon.

2. The apparatus of claim 1, wherein the beacon comprises a laser beam.

3. The apparatus of claim 1, wherein the instructions are executable to:
   identify location of the prop in the RW over time.

4. The apparatus of claim 3, wherein the instructions are executable to:
   transmit the beacon at least in part based on the location of the prop in the RW.

5. The apparatus of claim 1, wherein the beacon comprises an audible sound.

6. The apparatus of claim 1, wherein the beacon comprises a screen display on a handset.

7. A device comprising:
   at least one computer storage that is not a transitory signal and that comprises instructions executable by at least one processor to:
   receive indication in virtual reality (VR) space of a virtual location; and
   transmit a visible or audible beacon toward a real world (RW) location corresponding to the virtual location.

8. The device of claim 7, wherein the virtual location is a desired location of a RW prop.

9. The device of claim 7, wherein the visible beacon comprises a laser beam.

10. The device of claim 7, wherein the instructions are executable to:
    identify location of the prop in the RW over time.

11. The device of claim 10, wherein the instructions are executable to:
    transmit the beacon at least in part based on the location of the prop in the RW.

12. The device of claim 7, wherein the beacon comprises an audible sound.

13. The device of claim 7, wherein the beacon comprises a screen display on a handset.

14. A computer-implemented method comprising:
    indicating a location in virtual space at which an object is desired to be located; and
    directing a beacon in the real world (RW) toward a RW location corresponding to the virtual location, the beacon comprising an audio sound or a visible beacon.

15. The method of claim 14, comprising:
    identify location of the object in the RW over time.

16. The method of claim 14, comprising:
    presenting the beacon at least in part based on the location of the object in the RW.

17. The method of claim 14, wherein the beacon comprises an audible sound.

* * * * *